United States Patent
Storteig et al.

(10) Patent No.: US 7,778,109 B2
(45) Date of Patent: Aug. 17, 2010

(54) CURRENT PREDICTION IN SEISMIC SURVEYS

(75) Inventors: Eskild Storteig, Lierskogen (NO); William R. B. Lionheart, High Peak (GB)

(73) Assignee: WesternGeco L.L.C., Houston, TX (US)

( * ) Notice: Subject to any disclaimer, the term of this patent is extended or adjusted under 35 U.S.C. 154(b) by 48 days.

(21) Appl. No.: 11/292,600

(22) Filed: Dec. 2, 2005

(65) Prior Publication Data

US 2007/0127312 A1    Jun. 7, 2007

(51) Int. Cl.
*G01V 1/38* (2006.01)
(52) U.S. Cl. .......................... 367/16; 702/14
(58) Field of Classification Search ............... 367/15, 367/16; 702/14
See application file for complete search history.

(56) References Cited

U.S. PATENT DOCUMENTS

| | | | |
|---|---|---|---|
| 5,761,153 A * | 6/1998 | Gikas et al. | 367/19 |
| 6,418,378 B1 * | 7/2002 | Nyland | 702/14 |
| 6,618,321 B2 | 9/2003 | Brunet | |
| 6,775,619 B2 * | 8/2004 | Nyland | 702/14 |
| 6,932,017 B1 | 8/2005 | Hillesund et al. | |
| 2004/0100867 A1 * | 5/2004 | Brunet | 367/89 |
| 2005/0276161 A1 * | 12/2005 | Olivier | 367/17 |
| 2005/0279268 A1 * | 12/2005 | Storteig et al. | 114/274 |

* cited by examiner

*Primary Examiner*—Mark Hellner

(57) ABSTRACT

A method for use in seismic surveying includes determining the shape of a seismic cable during a seismic survey; determining the tension on the seismic cable at a plurality of points along the seismic cable; and predicting a current that will impact the seismic cable from the determined shape and the determined tension. The method may be practiced two-dimensionally in the context of a marine survey employing a towed streamer array or three-dimensionally in the context of laying an array of ocean bottom cables on the seabed. The predicted currents can, in some embodiments, be used to make steering corrections for the seismic cables.

25 Claims, 6 Drawing Sheets

CURRENT PREDICTION IN SEISMIC SURVEYS

BACKGROUND OF THE INVENTION

1. Field of the Invention

The present invention pertains to seismic surveying and, more particularly, to predicting currents during the deployment of survey equipment.

2. Description of the Related Art

Seismic exploration is conducted on both land and in water. In both environments, exploration involves surveying subterranean geological formations for hydrocarbon deposits. A survey typically involves deploying acoustic source(s) and acoustic sensors at predetermined locations. The sources impart acoustic waves into the geological formations. Features of the geological formation reflect the acoustic waves to the sensors. The sensors receive the reflected waves, which are detected, conditioned, and processed to generate seismic data. Analysis of the seismic data can then indicate probable locations of the hydrocarbon deposits.

Accurate knowledge of source and sensor positions is important to the accuracy of the analysis. In land surveys, accurate positioning is not particularly difficult because environmental conditions are usually relatively stable. Sources and sensors can be readily positioned where desired and, once placed, they usually do not shift to any great degree. Marine surveys, however, are different altogether. Marine surveys come in at least two types. In a first, an array of streamers and sources is towed behind a survey vessel. In a second type, an array of seismic cables, each of which includes multiple sensors, is laid on the ocean floor, or sea bottom, and a source is towed from a survey vessel. In both cases, many factors complicate determining the position of the sensors, including wind, currents, water depth, and inaccessibility.

One increasingly common marine seismic survey technique is known as "time-lapse seismic surveying." This technique essentially repeats earlier surveys over time to reveal changes in reservoirs of hydrocarbon deposits. One way to do this is to position the acoustic source(s) and receivers as close as is reasonably practicable to the positions of corresponding acoustic source(s) and receivers in the earlier survey(s).

Among the complicating factors mentioned above, ocean currents figure prominently. Currents may vary significantly in both direction and strength over the course of a marine seismic survey. Consider, for instance, a typical towed-array survey in which a vessel tows 8 streamers, each 6 km long and separated by 100 m. At any given instant, the survey covers 4.2 km$^2$. The survey vessel then will typically tow the streamers back and forth over distances of, for example, 120 km. Thus, the survey will cover quite a large area, and the currents within the survey area may vary dramatically. Or, in an ocean bottom survey, much attention is paid to the positioning of the seismic cables as they are laid. Control over the positioning helps optimize the deployment speed and accuracy and avoids tangling the seismic cable with other obstructions, such as other cables or sub-sea devices. However, currents may very greatly at different depths. The seismic cables are subjected to complexly varying currents as they descend through the water column to the seabed.

Thus, the ability to predict or project what the currents will do in the near future is greatly valued. If the surveyor knows what the currents will do, they can proactively act to offset undesirable effects of the currents. For instance, in a towed-array survey, the surveyor can steer deflectors, birds, or other steerable elements of the array to maintain the desired position for the streamers. Similarly, in an ocean bottom survey, the surveyor could steer the vessel as the cables are deployed to help offset drift induced by currents. Thus, one can use knowledge of incoming currents to mitigate positioning errors before they occur—a form of feed forward control—rather than waiting for the errors to occur and then correcting them—a form of feedback control.

Current techniques apply various modeling techniques to project the shape and/or position of the seismic cable during deployment. These models consider the physical characteristics of the seismic cable (e.g., weight, diameter, etc.) and account for the effect of predicted sea currents on the seismic cable as it descends to the sea floor. However, such methods provide only a model, or projection, of the seismic cable's shape and are predicated on a limited knowledge of the sea's properties.

The present invention is directed to resolving, or at least reducing, one or all of the problems mentioned above.

SUMMARY OF THE INVENTION

The invention, in its various embodiments, includes a method for use in seismic surveying. The method comprises determining the shape of a seismic cable during a seismic survey; determining the tension on the seismic cable at a plurality of points along the seismic cable; and predicting a current that will impact the seismic cable from the determined shape and the determined tension. The method may be practiced two-dimensionally in the context of a marine survey employing a towed streamer array or three-dimensionally in the context of laying an array of ocean bottom cables on the seabed. The predicted currents can, in some embodiments, be used to make steering corrections for the seismic cables.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
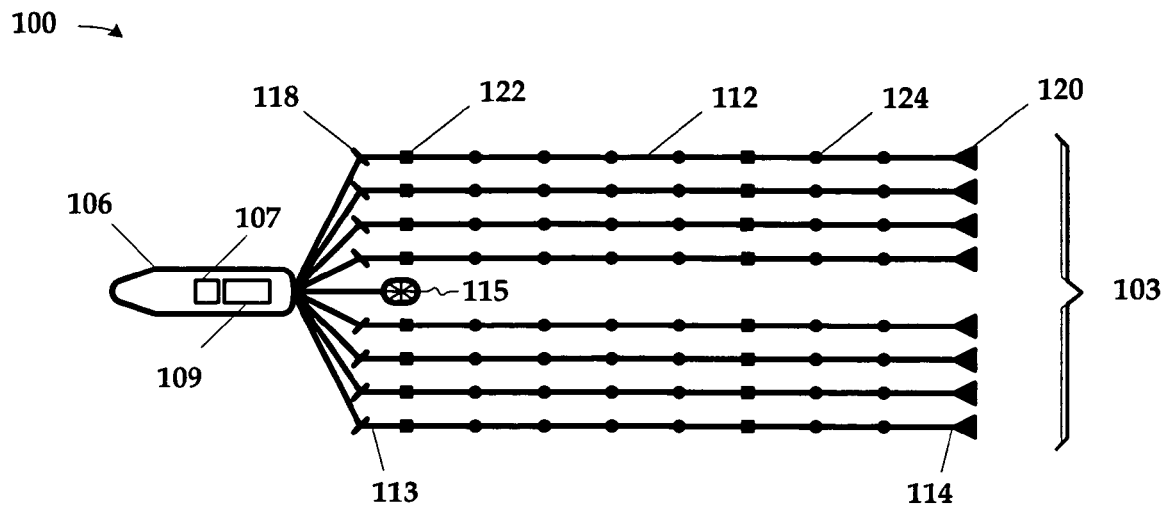
FIG. 1 is a schematic diagram of a seismic survey vessel and associated seismic data acquisition equipment.

FIG. 1 illustrates a survey system 100. In this particular embodiment, the survey system 100 generally includes an array 103 towed by a survey vessel 106 on board of which is an array controller 109. The towed array 103 comprises eight marine seismic cables 112 (only one indicated) that may, for instance, each be 6 km long. Note that the number of seismic cables 112 in the towed array 103 is not material to the practice of the invention. Thus, alternative embodiments may employ different numbers of seismic cables 112. The outermost seismic cables 112 in the array could be 700 meters apart, resulting in a horizontal separation between the seismic cables of 100 meters in the regular horizontal spacing configuration shown.

A seismic source 115, typically an airgun or an array of airguns, is also shown being towed by the seismic survey vessel 106. Note that in alternative embodiments, the seismic source 115 may not be towed by the survey vessel 106. Instead, the seismic source 115 may be towed by a second vessel (not shown), suspended from a buoy (also not shown), or deployed in some other fashion known to the art.

At the front of each seismic cable 112 is a deflector 118 (only one indicated) and at the rear of every seismic cable 112 is a tail buoy 120 (only one indicated). The deflector 118 horizontally positions the front end 113 of the seismic cable 112 nearest the seismic survey vessel 106. The tail buoy 120 creates drag at the tail end 114 of the seismic cable 112 farthest from the seismic survey vessel 106. The tension created on the seismic cable 112 by the deflector 118 and the tail buoy 120 results in the roughly linear shape of the seismic cable 112 shown in FIG. 1. Located between the deflector 118 and the tail buoy 120 are a plurality of seismic cable positioning devices known as "birds" 122. The birds 122 may be located at regular intervals along the seismic cable, such as every 200 to 400 meters. In this particular embodiment, the birds 122 are used to control the depth at which the seismic cables 112 are towed, typically a few meters. The seismic cables 112 also include a plurality of seismic receivers 124, or "hydrophones", (only one indicated) distributed along their length.

The array controller 109 typically interfaces with the navigation system (not shown) of the survey vessel 106. From the navigation system, the array controller 109 obtains estimates of system wide parameters, such as the towing direction, towing velocity, and current direction and measured current velocity. In the illustrated embodiment, the array controller 109 monitors the actual positions of each of the birds 122 and is programmed with the desired positions of or the desired minimum separations between the seismic cables 112. The horizontal positions of the birds 122 can be derived using various techniques well known to the art. The vertical positions, or depths, of the birds 122 are typically monitored using pressure sensors (not shown) attached to the birds 122.

Figure 2A:
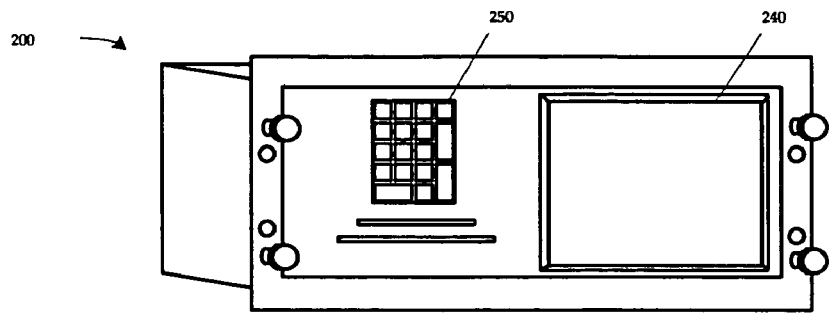
FIG. 2A and FIG. 2B conceptually illustrate an array controller as may be used in the embodiment of FIG. 1.
Figure 2B:
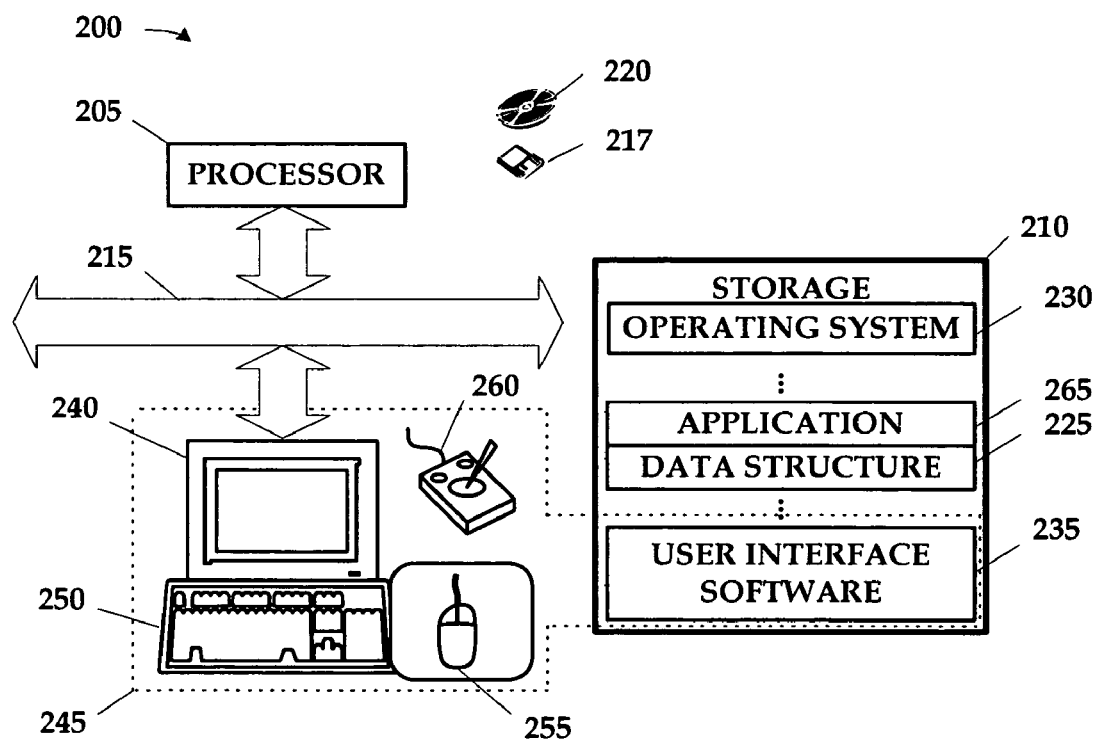

The array controller may be implemented as a rack-mounted computing apparatus 200, illustrated in FIG. 2A and FIG. 2B. The computing apparatus 200 includes a processor 205 communicating with some storage 210 over a bus system 215. The storage 210 may include a hard disk and/or random access memory ("RAM") and/or removable storage such as a floppy magnetic disk 217 and an optical disk 220. The storage 210 is encoded with a data structure 225 for storing a data set acquired as a result of the survey, an operating system 230, user interface software 235, and an application 265. The user interface software 235, in conjunction with a display 240, implements a user interface 245. The user interface 245 may include peripheral I/O devices such as a key pad or keyboard 250, a mouse 255, or a joystick 260. The processor 205 runs under the control of the operating system 230, which may be practically any operating system known to the art. The application 265 is invoked by the operating system 230 upon power up, reset, or both, or upon manual instruction through the user interface 245, depending on the implementation of the operating system 230.

Figure 3:
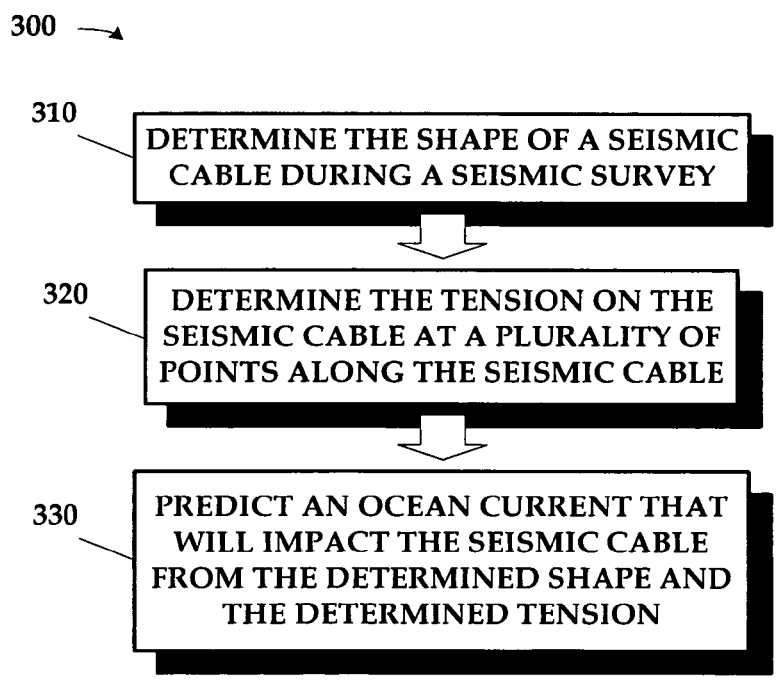
FIG. 3 illustrates one particular embodiment of a method in accordance with the present invention.

FIG. 3 illustrates a method 300 performed in accordance with the present invention. In general, the method begins by determining (at 310) the shape of a seismic cable (e.g., a seismic cable 112, in FIG. 1) during a seismic survey and determining (at 320) the tension on the seismic cable at a plurality of points along the seismic cable. The determination of the cable shape (at 310) and of the cable tension (at 320) can occur in parallel or in series. Once the shape and tension are determined (at 310, 320), the method 300 then predicts (at 310) an ocean current that will impact the seismic cable from the determined shape and the determined tension. Note that the method 300 is stated in terms of a single cable, i.e., a seismic cable 112 in the towed array 103 in FIG. 1. However, those ordinarily skilled in the art will appreciate that the method can be extrapolated to other seismic cables 112, or even all of the seismic cables 112, of the array 103. Furthermore, given the present disclosure, those ordinarily skilled in the art will readily be able to do so. The method 300 is implemented in software by the application 265, shown in FIG. 2B, upon its invocation.

Figure 4:
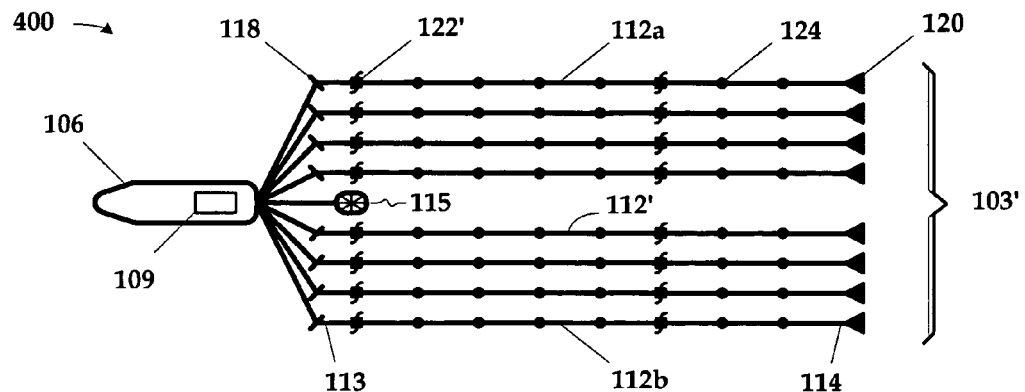
FIG. 4 depicts one particular embodiment of the survey system of FIG. 1.

To further an understanding of the present invention, one particular embodiment will now be disclosed. FIG. 4 illustrates a special case of the seismic survey system 100 in FIG. 1. The seismic survey system 400, shown in FIG. 4, differs from the seismic survey 100, shown in FIG. 1, by the inclusion of steerable birds 122' on the seismic cables 112' of the array 103'. In one particular embodiment, the steerable birds 112' are implemented with Q-fin™ steerable birds as are employed by Western Geco, the assignee hereof, in their seismic surveys. The principles of design, operation, and use of such steerable birds are found in PCT International Application WO 00/20895, entitled "Control System for Positioning of Marine Seismic Streamers", filed under the Patent Cooperation Treaty on Sep. 28, 1999, in the name of Services Petroliers Schlumberger as assignee of the inventors Oyvind Hillesund et al ("the '895 application"). This document is hereby incorporated by reference for all purposes as if set forth verbatim herein for all that it teaches. The following text relative to FIG. 5A-FIG. 5B is excerpted from this document.

Figure 5A:
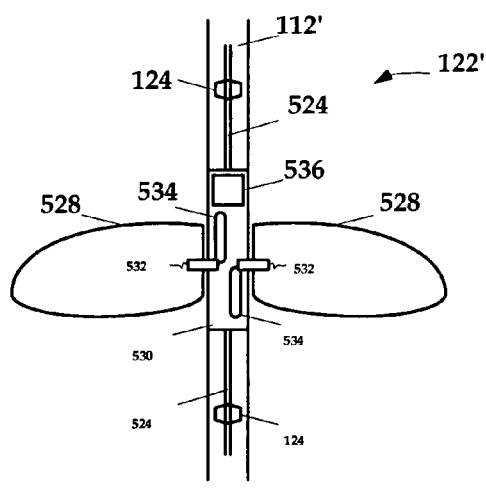
FIG. 5A-FIG. 5B are a schematic horizontal cross-sectional view through a marine seismic streamer and an attached streamer positioning device, as first shown in FIG. 4, and a schematic vertical cross-sectional view through the streamer positioning device from FIG. 5A, respectively.
Figure 5B:
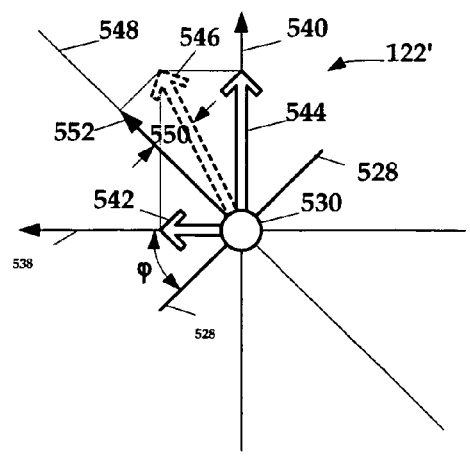

FIG. 5A shows a type of bird 122' that is capable of controlling the position of seismic cables 112' in both the vertical and horizontal directions. A second embodiment of the bird 122' is disclosed in our PCT International Application No. WO 98/28636, entitled "Control Devices for Controlling the Position of a Marine Seismic Streamer", filed Dec. 19, 1997, in the name of Geco AS as assignee of the inventor Simon Bittleston ("the '636 application"). A number of alternative designs for the vertically and horizontally steerable birds 122' are possible, including those utilizing one full-moving wing with ailerons, three full-moving wings. However, and four full-moving wings, the independent two-wing principal is, conceptually, the simplest and most robust design.

In FIG. 5A, a portion of the seismic cable 112' is shown with an attached bird 122'. A communication line 524, which may consist of a bundle of fiber optic data transmission cables and power transmission wires, passes along the length of the seismic cable 112' and is connected to the seismic sensors, seismic receivers 124, that are distributed along the length of the seismic cable, and to the bird 122'. The bird 122' preferably has a pair of independently moveable wings 528 that are connected to rotatable shafts 532 that are rotated by wing motors 534 and that allow the orientation of the wings 528 with respect to the bird body 530 to be changed. When the shafts 532 of the bird 122' are not horizontal, this rotation causes the horizontal orientation of the wings 528 to change and thereby changes the horizontal forces that are applied to the seismic cable 112' by the bird 122'.

The motors 534 may be any type of device capable of changing the orientation of the wings 528 relative to the streamer 112'. They are preferably either electric motors or hydraulic actuators. The local control system 536 controls the movement of the wings 528 by calculating a desired change in the angle of the wings 528 and then selectively driving the motors 534 to effectuate this change. This control is exercised within the context of instructions from the array controller 109, showing FIG. 5, received over the communications line 524. Such instructions may include, for example, desired horizontal and vertical positioning. While the preferred embodiment depicted utilizes a separate motor 534 for each wing 528. It would be also be possible to independently move the wings 528 using a single motor 534 and a selectively actuatable transmission mechanism.

FIG. 5B shows a schematic vertical cross-sectional view through the steerable bird 122' that will allow the operation of the inventive control system to be described in more detail. The components of the bird 122' shown in FIG. 5B include the wings 528 and the body 530. Also shown in FIG. 5B are a horizontal coordinate axis 538 and a vertical coordinate axis 540. During operation of the streamer positioning control system, the array controller 109, shown in FIG. 4, preferably transmits at regular intervals (such as every five seconds) a desired horizontal force 542 and a desired vertical force 544 to the local control system 536. The desired horizontal force 542 and the desired vertical force 544 are combined within the local control system 536 to calculate the magnitude and direction of the desired total force 546 that the array controller 109 has instructed the local control system to apply to the seismic cable 112'. The array controller 109 could alternatively provide the magnitude and direction of the desired total force 546 to the local control system 536 instead of the desired horizontal force 542 and the desired vertical force 544.

While the desired horizontal force 542 and the desired vertical force 544 are preferably calculated by the array controller 109, it is also possible for the local control system 536 to calculate one or both of these forces using a localized displacement-force conversion program. This type of localized conversion program may, for instance, use a look-up table or conversion routine that associates certain magnitudes and directions of vertical or horizontal displacements with certain magnitudes and directions of changes in the vertical or horizontal forces required. Using this type of embodiment, the array controller 109 can transmit location information to the local control system 536 instead of force information. Instead of the desired vertical force 544, the array controller 109 can transmit a desired vertical depth and the local control system 536 can calculate the magnitude and direction of the deviation between the desired depth and the actual depth. Similarly, instead of transmitting a desired horizontal force 542, the array controller 109 can transmit the magnitude and direction of the displacement between the actual horizontal position and the desired horizontal position of the bird 122'.

When the local control system 536 has a new desired horizontal force 542 and desired vertical force 544 to be applied, the wings 528 will typically not be in the proper orientation to provide the direction of the desired total force 546 required. As can be seen in FIG. 5B, the wings 528 introduce a force into the seismic cable 112' along an axis perpendicular to the rotational axis of the wings 528 and perpendicular to the streamer. This force axis 548 is typically not properly aligned with the desired total force 546 when new desired horizontal and vertical force values are received from the array controller 109 or determined by the local control system 536 and some rotation of the bird 122' is required before the bird 122' can produce this desired total force 546. As can be seen, the force axis 548 is directly related to the bird roll angle, designated in FIG. 5B as $\phi$.

The local control system 536 optimizes the control process by projecting the desired total force 546 onto the force axis 548 (i.e., multiplying the magnitude of the desired total force by the cosine of the deviation angle 550) to produce an intermediate desired force 552 and then adjusting the wing common angle $\alpha$ (the angle of the wings with respect to the bird body 530, or the average angle if there is a non-zero splay angle) to produce this magnitude of force along the force axis. The calculated desired common wing angle is compared to the current common wing angle to calculate a desired change in the common wing angle and the wing motors 534 are actuated to produce this desired change in the orientation of the wings.

A splay angle is then introduced into the wings 528 to produce a rotational movement in the bird body 530 (i.e., to rotate the force axis 548 to be aligned with the desired total force 546). The splay angle is the difference between the angles of the wings 528 with respect to the bird body 530. As the bird body 530 rotates and the force axis 548 becomes more closely aligned with the desired total force 546, the bird roll angle and the bird roll angular velocity are monitored, the splay angle is incrementally reduced, and the common angle is incrementally increased until the intermediate desired force 552 is in the same direction and of the same magnitude as the desired total force. The local control system 536 carefully regulates the splay angle to ensure that the streamer is stable in roll degree of freedom. The calculated common wing angle and the splay angle are also regulated by the local control system 536 to prevent the wings 528 from stalling and to ensure that the splay angle is prioritized.

When using the type of birds described in the '636 application, where the bird 122' is rigidly attached, and cannot rotate with respect, to the seismic cable 112', the control system should take the streamer twist into account. Otherwise, the bird 122' can use all of its available splay angle to counter the twist in the seismic cable 112'. The bird 122' will then be unable to reach the demanded roll angle and the generated force will decrease.

In the anti-twist function, the streamer twist is estimated by weight-function filtering the splay angle measurements instead of simply averaging the splay angle measurements to improve the bandwidth of the estimation. The anti-twist function engages when the estimated twist has reached a critical value and it then overrides the normal shortest path control of the calculated roll angle. The anti-twist function forces the bird 122' to rotate in the opposite direction of the twist by adding ±180° to the demanded roll angle. Once the twist has been reduced to an acceptable value, the anti-twist function disengages and the normal shortest path calculation is continued.

The untwist function is implemented by the array controller 109 which monitors the splay angle for all of the birds 122' in each seismic cable 112'. At regular intervals or when the splay angle has reached a critical value, the array controller 109 instructs each local control system 536 to rotate each bird 122' in the opposite direction of the twist. The number of revolutions done by each bird 122' is monitored and the untwist function is disengaged once the twist has reached an acceptable level.

Referring now again to FIG. 3, the shape of the seismic cable 112' may be determined (at 310) using any of a variety of techniques known to the art. For instance, satellite-based global positioning system equipment can be used to determine the positions of the equipment. Alternatively, or in addition to GPS, commonly employed acoustic positioning techniques may be employed. The horizontal positions of the birds 122 can be derived, for instance, using the types of acoustic positioning system described in:

(i) U.S. Pat. No. 4,992,990, entitled "Method for Determining the Position of Seismic Streamers in a Reflection Seismic Measuring System", issued Feb. 12, 1991, to Geco A.S. as assignee of the inventors Langeland, et al. (the "'990 patent");

(ii) U.S. application Ser. No. 10/531,143, entitled "Method and Apparatus for Positioning Seismic Sensing Cables", filed Apr. 8, 2005, in the name of James L. Martin et al. (the "'143 application"); and (iii) International Application Ser. No. PCT/GB 03/04476 entitled "Method and Apparatus for Determination of an Acoustic Receiver's Position", filed Oct. 13, 2003, in the name of James L. Martin et al. (the "'476 application").

These documents are hereby incorporated by reference for all purposes as if set forth verbatim herein. However, any suitable technique known to the art for cable shape determination may be used.

Note that the '990 patent is directed to use in a towed array while the '143 application and the '476 application are directed to ocean bottom cables. One significant difference between the two is that the case of the towed streamer can be simplified to a two-dimensional problem whereas the case for the ocean bottom cable is three-dimensional. The effect of the depth, or vertical position, of the seismic cable 112 in the embodiment of FIG. 1 is not considered as the vertical component of current usually is small relative to the current in the planes parallel to the sea. Thus, the two-dimensional case may be considered a subset of the three-dimensional case. The position-determining techniques disclosed in the '143 application and the '476 application are therefore applicable to both towed-array applications and ocean bottom embodiments.

Note that the towed array case could also be modeled as 3D. However, a 2D model may generally be preferred since the motions and currents of main interest are taking place in a plane parallel to the plane of the sea's surface at the depth of the streamers. A 2D model will also be more cost effective for computations. The seabed cable, however, is not moving in one plane and so should be modeled as 3D For the sake of completeness, and to help further an understanding of the present invention, one particular acoustic positioning technique will be generally disclosed. In general, one positioning technique employs a triangulation approach with one or more acoustic sources and three or more acoustic receivers. The acoustic sources generate acoustic signals that are distinguishable from those generated by the seismic source 115, shown in FIG. 1. More particularly, the following discussion is excerpted from the 990 patent incorporated by reference above.

One suitable acoustic positioning technique is based on acoustic trilateration. Trilateration involves the use of hydroacoustic distance measurements between a plurality of acoustic transceivers (i.e., the seismic receivers 124) arranged in a suitable manner. At the same time at least two points of the measuring system are determined by means of surface navigation methods. These points may preferably be the survey vessel 106, a tail buoy 120 on the seismic streamer 112, or even more advantageously, a float (e.g., the deflector 118) which is towed by the vessel 106 in such a manner that it is located on the side of or near the beginning of the seismic streamer 112. Since all the units of the measuring system, whether being buoys, floats, seismic sources, vessels or seismic streamers, are more or less submerged, it is a fairly simple matter to measure the distance between these units below the surface by means of hydroacoustic distance measurements.

Therefore, acoustic transceivers are provided at every point, whose mutual distances it is desired to determine, i.e., aboard the vessel 106 on the seismic sources 115, on the end points of the seismic stretch sections and possibly also in the active sections of the seismic streamers 112 and on the float or floats towed by the vessel 106 as well as in the tail buoys 120. For instance a vessel 106 and a float or the vessel 106 and a tail buoy may now be suitably positioned by means of surface navigation systems. By means of distance measurements between the hydroacoustic measuring devices, i.e., the acoustic transceivers, a triangle network may be established, comprising the vessel 106, floats, buoys 120, points on the seismic streamers 112 and the seismic sources 115. Then a triangle network may be established between every measuring point and the measuring points of the triangle network may be referred to absolute reference positions, for instance the position of a vessel 106 or a buoy 120. Hence the position of all the acoustic transceivers may be absolutely determined. The acoustic distance measurements may be integrated with the position determinations for instance in a computer system located aboard the vessel 106.

Note that the shape determination occurs, in this particular embodiment, as the seismic cable 112 is towed. The survey vessel 106 typically tows the array 103 at around 2.5 m/s. Since acoustic positioning of the cable allows us to know the cable shape typically every 10 seconds and every 100 meter of cable the space and time partial derivatives can be calculated with a similar resolution in time and space.

Returning to FIG. 3, the tension on the seismic cable 112' may be determined (at 320) using any of a variety of techniques known to the art. Tension can for example be measured by a strain gauge, in which electrical resistance of a length of wire varies in direct proportion to the change in any strain applied to it. If no direct measurement is available, the determination (at 320) may be made by estimating the tension. Fairly good estimations can be arrived at using, for example, the diameter of the cable and the speed at which it is moving. (The diameter is a known physical characteristic of the cable and the speed can be determined using positioning information associated with the survey itself.) However, measurement is usually easier and will typically render more accurate results.

Referring again to FIG. 3, the ocean current prediction (at 330), in this particular embodiment, inverts partial differential equations that describe the cable dynamics in water to solve for the unknown current by knowing the cable shape and tension as a function of time. Mathematical formulations for the differential equations describing cable dynamics in water are described in several articles in the open literature For example, such are disclosed in:

(i) Dowling, Ann P., "The Dynamics of Towed Flexible Cylinders. Part 1. Neutrally Buoyant Elements", 187 Journal of Fluid Mechanics 507-532 (1988);
(ii) Dowling, Ann P., "The Dynamics of Towed Flexible Cylinders. Part 2. Neutrally Buoyant Elements", 187 Journal of Fluid Mechanics 533-571 (1988); and
(iii) Ablow, C. M. & Schecter, S., "Numerical Simulation of Undersea Cable Dynamics", 10 Ocean Engineering 443-457 (1983).

Numerical solutions to these equations makes it possible to simulate changes in cable shape due to given changes in currents.

The partial differential equations which describe the cable dynamics in water are inverted to solve for the unknown current by knowing the cable shape and tension as a function of time. Since acoustic positioning of the seismic cable 112' allows us to know the cable shape typically every 10 seconds and every 100 meter of seismic cable 112' the space and time partial derivatives can be calculated with a similar resolution in time and space. By also measuring/estimating cable tension along the seismic cable 112' and the currents can be solved for. The method is also applicable when there are steerable elements present on the cable.

Some measurement inaccuracies on the cable positions will occur which, during numerical differentiation, will cause further inaccuracies into the calculation of currents. These errors can be reduced by known methods for smoothing of the data in space and time. Also, since the steering force from the steerable elements is a function of the current, an iterative procedure, e.g., Newton-Raphson, may be used when they are present. The Newton-Raphson method, also sometimes called Newton's method or Newton's iteration, is a root-finding algorithm that uses the first few terms of the Taylor series of a function $f(x)$ in the vicinity of a suspected root. Several good sources on this technique are available, such as Whittaker, E. T. and Robinson, G., "The Newton-Raphson Method." §44 in *The Calculus of Observations: A Treatise on Numerical Mathematics*, pp. 84-87 (4$^{th}$ Ed. New York: Dover 1967).

Furthermore, at the high tension front end 113 of the seismic cable 112', current changes have less impact on the cable curvature than at the low-tension tail end 114. It is therefore expected that direct prediction of the ocean current by the present invention alone will be more accurate at the tail end 114 of the seismic cable 112' than at the high tension front end 113. To compensate for this, some embodiments may augment the present invention with actual current measurements. Typically, an Acoustic Doppler Current Profiler ("ADCP") 107 is mounted on the survey vessel 106 and measures the current in the water column below the survey vessel 106 every 60 seconds or so. Typical vessel speed is 2.5 m/s, which means that the current is measured approximately every 150 m along the track. This gives a first estimate to a current distribution along the seismic cable 112' when the survey vessel 106 is following a track for seismic production.

Since the tail end 114 of the seismic cable 112' typically reaches the inline position of the survey vessel 106 several 10s of minutes after the survey vessel 106 passed this position, the tail end current is likely to be inaccurate by measurements alone. It is also known that the current may vary considerably from the outermost starboard seismic cable 112a to the port seismic cable 112b. By combining the measurements at the survey vessel 106 or other front end locations, and the mathematical inverted solution for cable shapes the current distribution along the each seismic cable 112' can be calculated. During the iteration process to establish the current distribution along the seismic cable 112's, more weight can be given to the measured current at the front end of the spread. The current measurement by the ADCP 107 may be further improved by measuring current at other points in the spread than at the survey vessel 106.

Figure 6:
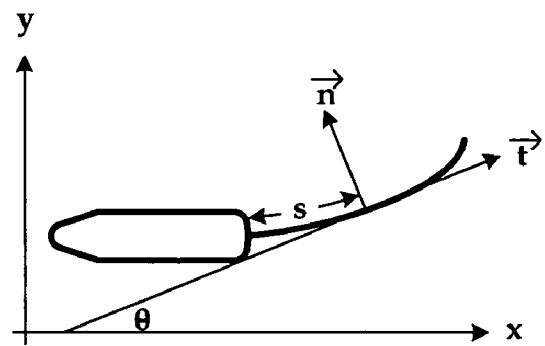
FIG. 6 is a conceptualized representation of a seismic cable and the survey vessel of the embodiment of FIG. 1 illustrating several of the factors in the implementation of the present invention.
Figure 7:
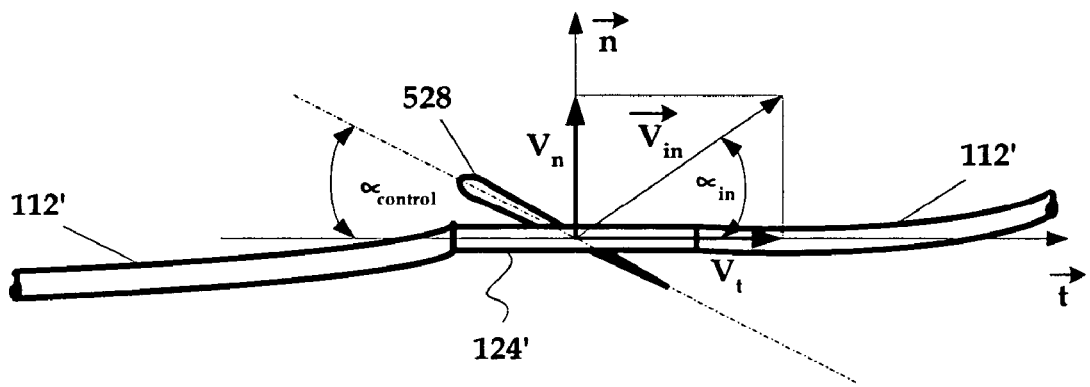
FIG. 7 is a conceptualized representation of a seismic cable and steerable bird of the embodiment of FIG. 4 illustrating several of the factors in the implementation of the present invention.

Referencing the nomenclature in Table 1 and the concepts illustrated in FIG. 6-FIG. 7, a mathematical model and method of solution without steerable elements along the neutrally buoyant, inextensible cable, applying Newton's Second Law yields:

TABLE 1

Nomenclature for the 2D Case $$m\left\{\frac{\partial V_t}{\partial t} - V_n\frac{\partial \theta}{\partial t}\right\} = \frac{\partial T}{\partial s} + f_t \quad (1)$$

$$m\left\{\frac{\partial V_t}{\partial t} - V_n\frac{\partial \theta}{\partial t}\right\} = \frac{\partial T}{\partial s} + f_t + F_a + F_b \quad (2)$$

| Quantity | Definition |
|---|---|
| $f_t$ | Viscous force acting on the cable per unit length in the tangential direction |
| $f_n$ | Hydrodynamic force acting on the cable per unit length in the normal direction |
| T(s) | Tension in the cable at a distance s along its shape |
| s | Distance along the cable shape from the front end of the cable |
| x, y | Cartesian coordinates as shown in FIG. 6 |
| $V_t$ | Cable velocity relative to ground in the direction tangential to the cable |
| $V_n$ | Cable velocity relative to ground in the direction normal to cable |
| U | Current velocity relative to ground in the direction tangential to the cable |
| v | Current velocity relative to ground in the direction normal to the cable |
| m | Mass per unit length of cable |
| ρ | Water density |
| θ | Angle between the Cartesian x-axis and the tangent vector of the cable as shown in FIG. 6 |
| t | Time |
| $F_a$ | Force per unit length of cable due to hydrodynamic added mass |
| $F_b$ | Force per unit length of cable due to cable bending |
| $α_{control}$ | Rotated angle of the Q-fin hydrofoil relative to the axis of the Q-fin housing |
| $α_{in}$ | Local inflow angle at the Q-fin relative to the local streamer axis |
| $α_e$ | Effective angle of attack for Q-fin |

TABLE 1-continued

| | |
|---|---|
| $\vec{t}$ | Unit vector tangent to the cable shape at a distance s along the cable |
| $\vec{n}$ | Unit vector normal to the cable shape at a distance s along the cable |

For slowly varying cable shapes, typical for most towed seismic cables, it can be shown that the inertia term can be neglected:

$$0 = \frac{\partial T}{\partial s} + f_t \quad (3)$$

$$0 = \frac{\partial T}{\partial s} + f_n \quad (4)$$

Tangential and normal velocities to the cable are represented by:

$$V_{tr} = V_t - u \quad (5)$$

$$V_{nr} = V_n - v \quad (6)$$

where u, v are the inline and normal ocean current velocities, respectively, relative to an earth fixed coordinate system.

The tangential force per unit length is:

$$f_t = \frac{1}{2}\rho \pi d C_t V_{tr}|V_{tr}| \quad (7)$$

And the normal force per unit length:

$$f_n = \frac{1}{2}\rho d C_n V_{nr}|V_{nr}| \quad (8)$$

The inverse method involves getting these forces:

$$f_t = m\left\{\frac{\partial V_t}{\partial t} - V_n\frac{\partial \theta}{\partial t}\right\} = \frac{\partial T}{\partial s} \quad (9)$$

$$f_n = T\frac{\partial \theta}{\partial s} + F_a + F_b - m\left\{\frac{\partial V}{\partial t} - V\frac{\partial \theta}{\partial t}\right\} = r(s, t) = r \quad (10)$$

by numerical differentiation—which is a mildly ill-posed problem. In order to facilitate the numerical differentiation, accurate position and tension measurements are needed. In this case, an explicit expression for (u,v) can be found.

First we review the regularization of linear ill-posed problems. Let K be a compact integral operator of function s on an interval. A pertinent example, and simplified version of our problem is to solve K $[f]$=g where K is a left inverse of differentiation, K $[g']$=g and g is known with some error. The generalized Tikhonov regularization approach is to find an $f$ that minimizes:

$$\|K[f]-g\|^2 + \alpha^2\phi(f) \quad (11)$$

where the penalty term $\phi$ is typically taken to be a squared norm or semi-norm such as $\|P[f-f_0]\|^2$ for a differential operator P, and some typical value of $f$, $f_o$.

This represents a trade-off between fitting the data and enforcing a reasonable prior constraint on the norm of the solution. When discretized, K is represented by an ill-conditioned matrix K, and $f$ and g are vectors. Regularization now has a statistical interpretation. We assume that $f$ is a vector valued random variable, the probability density function represents prior information about this variable before the data is measured. We also assume that the noise in the data g has some known distribution. In the cases the errors are Gaussian with zero mean and variance $\sigma^2$, and the prior is a distribution proportional to $\exp(-\phi(f))$ the Tikhonov regularized solution (the minimizer of Eq. (11)), then maximizes the posterior probability distribution given the prior distribution and the measurement (for some value of $\alpha$).

One approach regularizes the desired parameter (u,v) using a penalty term as above defined by a difference operator that approximates a partial differential operator in space and time. A second approach derives a prior distribution for the desired parameters, (u,v) as functions of space and time, from the ADCP 107, which gives a reasonably tight estimate of the current beneath the survey vessel 106, known tidal streams information, and an estimate of the variability of the current as a function of time after it was measured. This estimate could be derived from observations over a suitable time period from an anchored or drifting buoy. Even with a simple difference operator as the assumed inverse of the covariance matrix, the balance between spatial and temporal terms could be obtained empirically from such data.

Note that, near the survey vessel 106, the estimate of the current from the position of the seismic cables 112' is less accurate as they are more tightly constrained. However, the ADCP gives a more reliable current prediction here. Whereas far from the vessel 106, where the seismic cables 112' are freer to move with the current, the information from the ADCP 107 at the vessel 106 gives a poorer indication of the current (at any given position relative to the seabed, the ADCP 107 tells only what the current was when the survey vessel 106 passed over that point). The combination of these two uncertain but complimentary sources of information will lead to a more reliable estimate of the current than either of them individually. With sufficiently simple probability models, the maximum a posteriori ("MAP") estimate can be obtained using optimization techniques.

Taking the system represented in Eq. (3) and Eq. (4), where the inertia terms in braces are ignored:

$$K[f_t] = -T \quad (12)$$

$$K\left[\frac{f_n}{T}\right] = \theta \quad (13)$$

where now K is the inverse of $$\frac{\partial}{\partial s},$$

as the linear ill-posed system of equations. Actually the tension T is quite accurately known, so Eq. (13) could be regarded as the inverse problem. For the simplest formulation, assuming multivariate Gaussian errors in the data, and a multivariate Gaussian prior on $f_t$ and $f_n$ the standard generalized Tikhonov regularization, see A. Tarantola, "Inverse Problem Theory" (Elsevier 1987), yields the MAP estimate as the solution of a linear system of equations. Relaxing the Gaussian assumptions, to the weaker Gauss-Markov assumptions of M. Foster, "An Application of the Wiener Kolmogorov Smoothing Theory to Matrix Inversion," 9 J. SIAM 387-392 (1961), the generalized Tikhonov solution is the optimal linear estimator.

Another, computationally demanding, approach formulates a probability model for the parameters (u,v) and then using the nonlinear relation to derive the probability density function for $f_t$ and $f_n$, resulting in a non-quadratic optimization problem. At this stage as the optimization is already non-quadratic u and v could be used as the primary variables. This could be solved by standard optimization techniques such as nonlinear conjugate gradient method. In this case the inertia terms and steerable elements along the cable could also be included if needed.

The use of the discrete steerable elements, i.e., the steerable birds 122', on the seismic cables 112' does introduce some practical considerations. The steerable birds 122', as is disclosed more fully above relative to FIG. 5A, consist of a 1 m rigid tube (i.e., the body 530) with two individually steerable fins 528 attached to it. The steerable birds 122' are typically located usually every 300-400 m along the cable. In principle, there are two different approaches to including the forces arising from the steerable birds 122' into the calculation:

(a) include it as a point force in the normal and tangential direction to the seismic cable 112'; and
(b) include the steerable birds 122' as a distributed force over the discretization distance ds.

For option (a), a very dense resolution of the cable shape is preferred, reliability being a function of density. Therefore, at present, option (b) is more attractive.

For the distributed force option, i.e., option (b), the equations for the segments containing a steerable element become, for the 2D case:

$$m\left\{\frac{\partial V_t}{\partial t} - V_n \frac{\partial \theta}{\partial t}\right\} = \frac{\partial T}{\partial s} + f_t + f_{tb} \tag{14}$$

$$m\left\{\frac{\partial V_n}{\partial t} - V_t \frac{\partial \theta}{\partial t}\right\} = T\frac{\partial \theta}{\partial s} + f_n + f_{nb} \tag{15}$$

where $$f_{tb} = \frac{1}{2}\rho A C_D(\alpha_e) V_{in}^2 \tag{16}$$

$$f_{nb} = \frac{1}{2}\rho A C_L(\alpha_e) V_{in}^e \tag{17}$$

and the effective angle of attack $$\alpha_e = \alpha_{control} + \alpha_{in} \tag{18}$$

The inflow vector relative to the cable fixed coordinate system $$\vec{V}_{in} = [V_t - u, V_n - v] = [V_{tr}, V_{nr}] \tag{19}$$

$\alpha_{control}$ is a given control angle for the steerable birds 122' relative to the streamer axis. The inflow angle $\alpha_{in}$ is given by arctan $$\left(\frac{V_n - v}{V_i - u}\right).$$

In this case an iterative scheme, e.g., a Newton Raphson method, can be applied to solve for the unknown current vector (u,v).

Steering corrections can then be derived from the shape determination and applied via the steerable birds 122'. The array controller 109 preferably maintains a dynamic model of each of the seismic cables 112' and utilizes the desired and actual positions of the birds 122' to regularly calculate updated desired vertical and horizontal forces the birds 122' should impart on the seismic cables 112' to move them from their actual positions to their desired positions. Because the movement of the seismic cable 112' causes acoustic noise (both from water flow past the bird wing structures as well as cross-current flow across the streamer skin itself), the cable movements should be restrained and kept to the minimum correction required to properly position the seismic cables 112'. Any positioning device control system that consistently overestimates the type of correction required and causes the bird 122' to overshoot its intended position introduces undesirable noise into the seismic data being acquired by the streamer. In current systems, this type of over-correction noise is often balanced against the "noise" or "smearing" caused when the seismic sensors in the seismic cables 112' are displaced from their desired positions.

The array controller 109 preferably calculates the desired vertical and horizontal forces based on the behavior of each seismic cable 112' and also takes into account the behavior of the complete array 103. Due to the relatively low sample rate and time delay associated with the horizontal position determination system, the array controller 109 runs position predictor software to estimate the actual locations of each of the birds 122'. The array controller 109 also checks the data received from the navigation system (not shown) of the survey vessel 106 and the data will be filled in if it is missing. The interface between the array controller 109 and the local control system will typically operate with a sampling frequency of at least 0.1 Hz. The array controller 109 will typically acquire the following parameters from the vessel's navigation system: vessel speed (m/s), vessel heading (degrees), current speed (m/s), current heading (degrees), and the location of each of the birds 122' in the horizontal plane in a vessel fixed coordinate system.

The present invention may be used to produce relative velocities of the bird 122' with respect to the water in both the "in-line" and the "cross-line" directions. Alternatively, the array controller 109 could provide the local control system with the horizontal velocity and water in-flow angle. The force and velocity values are delivered by the array controller 109 as separate values for each bird 122' on each seismic cable 112' continuously during operation of the control system.

The invention admits variation in application. For instance, the invention is amenable to the laying operations for ocean bottom cables ("OBCs") in three dimensions, assuming suitable steerable elements can be developed and employed. Extending the two-dimensional discussion above to full 3D is a mathematical exercise that a skilled engineer or mathematician could do. See, in this regard, Yilmaz Turkilmaz, "Modeling and Control of Towed Seismic Cables", Ch. 2 (2004) (ISBN: 82-471-6249-0). For this case, a 3D model including of the cable has to be applied as described in, e.g., Eq. (3), and a gravitational term and a buoyancy term are included in the equations. A suitable shape determination technique is disclosed in U.S. application Ser. No. 10/531,143, entitled "Method and Apparatus for Positioning Seismic Sensing Cables", filed Apr. 8, 2005, in the name of James L. Martin et al. Tension measurements are relatively more important in this case when some cable is on the seabed some in the water column. Dense spatial sampling of positioning is needed for this. In the past accurate positioning every 150-400 m along the cable will give little useful information about currents in shallow waters. However, future plans for denser sampling will make this approach more feasible.

Thus, the present invention provides a method of predicting the real time ocean current-distribution along a seismic cable either in a towed streamer or seabed cable laying operation based on measured cable shape and cable tension as a function of time. The method may also include measured currents at discrete points to increase the accuracy of the predicted current. Steerable elements on the cables, e.g., steerable birds on towed streamers, may also be included in the method. The prediction of the unknown current uses the differential equations of motion for the cable and directly solves the inverse problem where one or more observations of cable shape and measured or estimated cable tensions are used to determine the current distribution along the cable that causes this particular cable shape.

The invention also admits variation in various aspects of implementation. For example, the method may also make use of measured currents, for example along the vessel path and/or tidal current information as a weighted guess to what the current is. At the high tension end of the streamer where the cable shape sensitivity to currents is smallest the weight function for the measured current will be greatest and at the tail end 114 the weight will be smallest.

The present invention may find use in, for example, time-lapse seismic surveying where accurate positioning of the hydrophone sensors on the streamer cable is desired. By detailed knowledge of current one can steer the streamer deflectors, the vessel and other steerable elements based on the knowledge of incoming currents (feed forward control) instead of passively waiting for the cable to come off target and then steer (feedback control).

The invention may also find use in improving cable steering for towed marine surveys when the vessel turns 180°. It is well known that cables get induced cross flow in turns and that the magnitude of this cross flow can be very significant. Trying to steer the cable transversely during a turn without the knowledge of local cross flow may cause the deflectors to stall, spin, or come to the surface. The goal is to turn as quickly as possible in a safe manner. Since the local cross-flow around the steerable birds can be predicted by the present invention, the steerable birds may be utilized in an efficient manner and turn times can be reduced.

The embodiments disclosed above generally involve use of the method of the invention during a current survey, i.e., a survey being conducted at the time the method is employed. However, the invention is not so limited. The invention may also be applied to "legacy" data, i.e., data from a previous survey that has been archived against some future use. Because of the high cost of surveying, the acquired data is usually saved for relatively long periods of time. It is also frequently desirable to conduct multiple surveys of the same area over a relatively extended period of time. In these circumstances, the method of the invention may be applied to legacy data to help determine sail lines for subsequent surveys in the same area.

Figure 8:
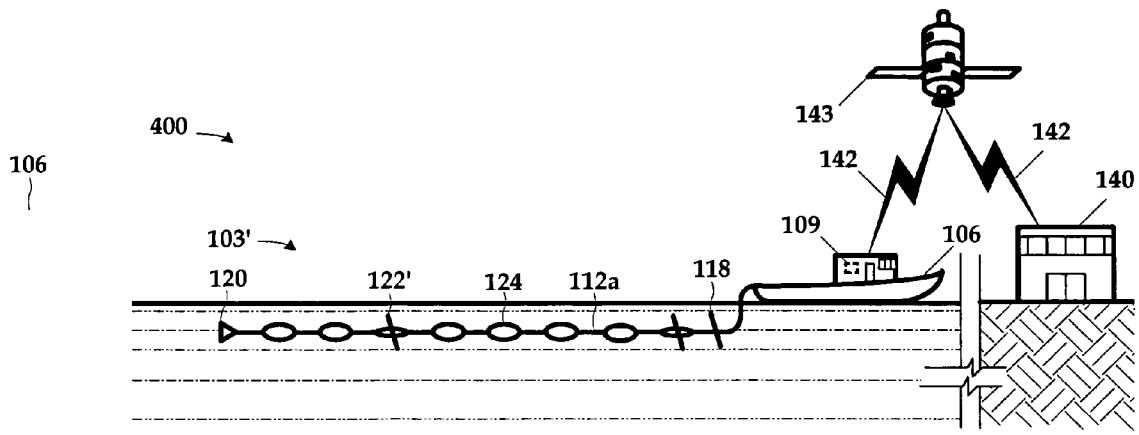
FIG. 8 depicts the marine seismic survey of FIG. 4 in profile, and includes transmission of the seismic data to a base facility.

More particularly, FIG. 8 illustrates the seismic survey 400 of FIG. 4 in profile. The marine seismic survey 100 may be conducted in virtually any body of water. The data collection unit 109 collects the seismic data for processing. The data collection unit 109 may process the seismic data itself, store the seismic data for processing at a later time, transmit the seismic data to a remote location for processing, or some combination of these things.

The data may be stored on a portable magnetic storage medium (not shown) or wirelessly transmitted from the survey vessel 106 to a processing center 140 for processing in accordance with the present invention. Typically, in a marine survey, this will be over satellite links 142 and a satellite 143. The data is then archived at the processing center 140 or some other suitable location on a suitable storage medium. The medium may be magnetic, such as a magnetic tape or a magnetic disk. Or, the medium may be optical, such as an optical disk. The method can then be applied to predict the currents that might be encountered in a future survey. The sail lines for the survey can then be planned in anticipation of those predicted currents.

Figure 9:
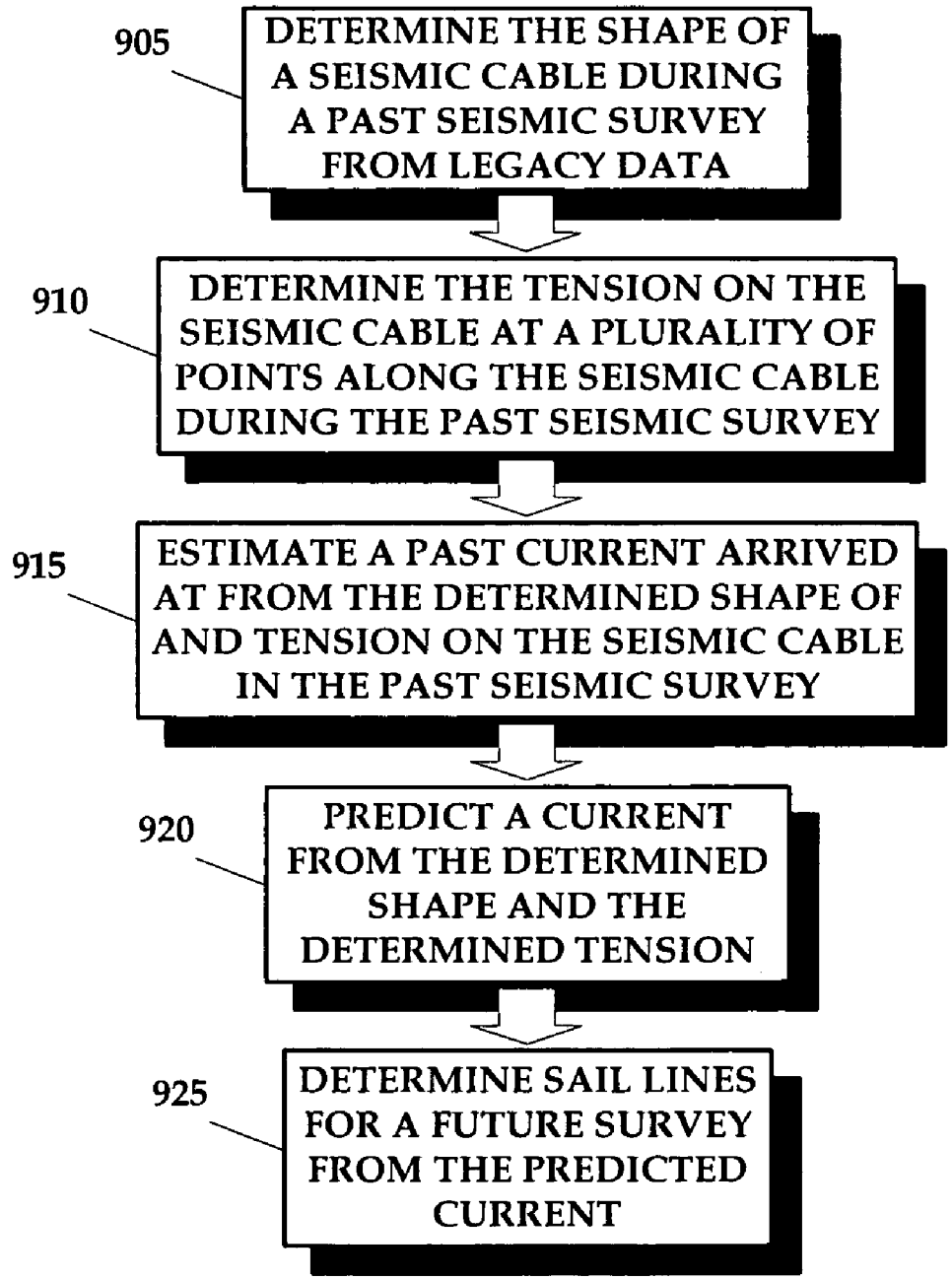
FIG. 9 illustrates an embodiment in which the present invention may be applied to legacy data to help determine sail lines for subsequent surveys.

FIG. 9 illustrates an exemplary 900 by which this particular embodiment may be implemented. The method 900 begins by determining (at 905) the shape of a seismic cable during a past seismic survey from legacy data. Next, the method 900 determines (at 910) the tension on the seismic cable at a plurality of points along the seismic cable during the past seismic survey. The method then estimates (at 915) a past current arrived at from the determined shape of and tension on the seismic cable in the past seismic survey. That is, the method 900 estimates the current that, in combination with the vessel's operation and other environmental conditions, generated the shape and tension of the seismic cable. The method 900 then predicts (at 920) a current from the determined shape and the determined tension. This predicted current is the current predicted to be encountered at a future survey and may be as simple as an adoption of the estimate (at 915) or as complicated as making corrections for changed conditions, e.g., faster towing speed, higher winds, etc. Finally, the method 900 determines (at 925) sail lines for a future survey from the predicted current.

Figure 10:
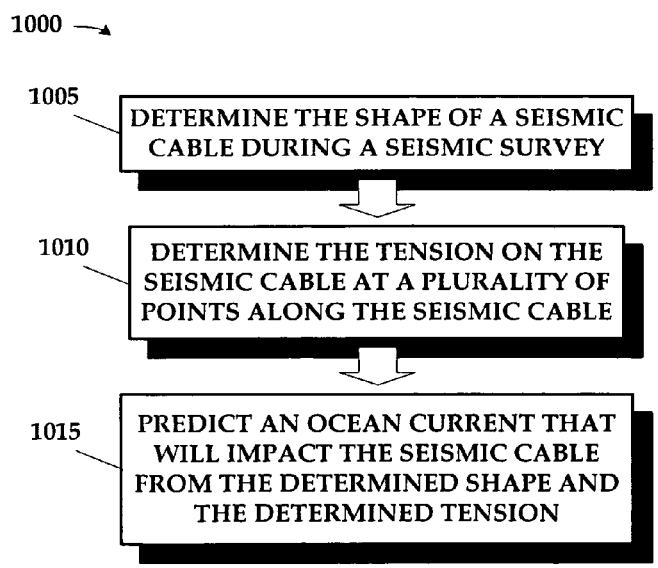
FIG. 10 illustrates another embodiment of the method of the invention more general that those presented in FIG. 3 or FIG. 9.

Thus, FIG. 10 presents a method 1000 that is another embodiment of the method of the invention more general that those presented in FIG. 3 or FIG. 9. The method 1000 is a method for use in seismic surveying. The method 1000 begins by determining (at 1005) the shape of a seismic cable during a seismic survey. Next, the method 1000 determines (at 1010) the tension on the seismic cable at a plurality of points along the seismic cable. And, finally, the method 1000 predicts (at 1015) a current from the determined shape and the determined tension.

As is apparent from the above discussion, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for use in marine seismic surveying, comprising:
    acquiring data representative of dynamic properties of a deployed marine seismic cable, the marine seismic cable including a plurality of steerable elements;
    determining a current that will impact the marine seismic cable at a future time from the acquired data; and
    feed forward controlling the steerable elements of the marine seismic cable to mitigate the impact the predicted current.

2. The method of claim 1, wherein determining the current includes:
    determining the shape of the seismic cable during a seismic survey;
    determining the tension on the seismic cable at a plurality of points along the seismic cable; and
    predicting the current from the determined shape and the determined tension.

3. The method of claim 2, wherein predicting the current includes determining a maximum a posteriori estimate of the ocean current that will impact the seismic cable from an assumed probability distribution of measurement errors in the tensions and positions and an assumed probability distribution of the current magnitude and direction.

4. The method of claim 2, wherein predicting the current includes predicting the current from the statistics of the spatial and temporal variation in the current magnitude and direction.

5. The method of claim 2, further comprising determining the steering forces acting on the seismic cable and wherein predicting the current includes predicting the current from determined steering forces.

6. An apparatus, comprising:
    a survey vessel;
    a seismic cable capable of being deployed from the survey vessel; and
    a computing apparatus aboard the survey vessel, programmed to perform a method for use in seismic surveying, comprising:
        receiving data representative of dynamic properties of a deployed marine seismic cable, the marine seismic cable including a plurality of steerable elements;
        determining a current that will impact the marine seismic cable at a future time from the acquired data; and
        feed forward controlling the steerable elements of the marine seismic cable to mitigate the impact the predicted current.

7. The apparatus of claim 6, wherein determining the current from the acquired data includes:
    determining the shape of the seismic cable during a seismic survey;
    determining the tension on the seismic cable at a plurality of points along the seismic cable; and
    predicting the current from the determined shape and the determined tension.

8. The apparatus of claim 7, wherein predicting the current includes determining a maximum a posteriori estimate of the ocean current that will impact the seismic cable from an assumed probability distribution of measurement errors in the tensions and positions and an assumed probability distribution of the current magnitude and direction.

9. The apparatus of claim 7, wherein predicting the current includes predicting the current from the statistics of the spatial and temporal variation in the current magnitude and direction.

10. The apparatus of claim 7, further comprising determining the steering forces acting on the seismic cable and wherein predicting the current includes predicting the current from determined steering forces.

11. A computer-implemented method for use in marine seismic surveying, comprising:
    determining a current that will impact a deployed marine seismic cable at a future time from properties of the marine seismic cable, the marine seismic cable including a plurality of streamer positioning devices; and
    feed forward controlling the streamer positioning devices of the marine seismic cable to mitigate the effect the predicted current.

12. The computer-implemented method of claim 11, wherein determining the current includes:
    determining the shape of the seismic cable during a seismic survey;
    determining the tension on the seismic cable at a plurality of points along the seismic cable; and
    predicting the current from the determined shape and the determined tension.

13. The computer-implemented method of claim 12, wherein predicting the current includes determining a maximum a posteriori estimate of the ocean current that will impact the seismic cable from an assumed probability distribution of measurement errors in the tensions and positions and an assumed probability distribution of the current magnitude and direction.

14. The computer-implemented method of claim 12, wherein predicting the current includes predicting the current from the statistics of the spatial and temporal variation in the current magnitude and direction.

15. The computer-implemented method of claim 12, further comprising determining the steering forces acting on the seismic cable and wherein predicting the current includes predicting the current from determined steering forces.

16. A program storage medium encoded with instructions that, when executed by a computing device, performs a method for use in marine seismic surveying, the method comprising:

determining a current that will impact a deployed marine seismic cable at a future time from properties of the marine seismic cable, the marine seismic cable including a plurality of streamer positioning devices; and feed forward controlling the streamer positioning devices of the marine seismic cable to mitigate the effect the predicted current.

17. The program storage medium of claim 16, wherein determining the current includes:

determining the shape of the seismic cable during a seismic survey;

determining the tension on the seismic cable at a plurality of points along the seismic cable; and predicting the current from the determined shape and the determined tension.

18. The program storage medium of claim 17, wherein predicting the current includes determining a maximum a posteriori estimate of the ocean current that will impact the seismic cable from an assumed probability distribution of measurement errors in the tensions and positions and an assumed probability distribution of the current magnitude and direction.

19. The program storage medium of claim 17, wherein predicting the current includes predicting the current from the statistics of the spatial and temporal variation in the current magnitude and direction.

20. The program storage medium of claim 17, further comprising determining the steering forces acting on the seismic cable and wherein predicting the current includes predicting the current from determined steering forces.

21. A computing apparatus, comprising:

a processor;

a bus system;

a storage communicating with the processor over the bus system; and a software component residing on the storage and capable of performing a method for use in marine seismic surveying when invoked by the processor, the method comprising determining a current that will impact a deployed marine seismic cable at a future time from properties of the marine seismic cable, the marine seismic cable including a plurality of streamer positioning devices; and feed forward controlling the streamer positioning devices of the marine seismic cable to mitigate the effect the predicted current.

22. The computing apparatus of claim 21, wherein determining the current includes:

determining the shape of the seismic cable during a seismic survey;

determining the tension on the seismic cable at a plurality of points along the seismic cable; and predicting the current from the determined shape and the determined tension.

23. The computing apparatus of claim 22, wherein predicting the current includes determining a maximum a posteriori estimate of the ocean current that will impact the seismic cable from an assumed probability distribution of measurement errors in the tensions and positions and an assumed probability distribution of the current magnitude and direction.

24. The computing apparatus of claim 22, wherein predicting the current includes predicting the current from the statistics of the spatial and temporal variation in the current magnitude and direction.

25. The computing apparatus of claim 22, further comprising determining the steering forces acting on the seismic cable and wherein predicting the current includes predicting the current from determined steering forces.

* * * * *